United States Patent [19]

Fagan

[11] 4,324,574
[45] Apr. 13, 1982

[54] FELT-LIKE LAYERED COMPOSITE OF PTFE AND GLASS PAPER

[75] Inventor: Joseph P. Fagan, Huntington, Conn.

[73] Assignee: E. I. Du Pont De Nemours and Company, Wilmington, Del.

[21] Appl. No.: 218,214

[22] Filed: Dec. 19, 1980

[51] Int. Cl.$^3$ .............................................. B01D 46/00
[52] U.S. Cl. ........................................ 55/487; 55/381; 55/524; 55/527; 55/528; 28/112; 28/111; 428/235; 428/300; 428/422
[58] Field of Search ................. 55/279, 381, 486–488, 55/522, 524, 527, 528; 428/234, 235, 300, 422; 28/111, 112

[56] References Cited

U.S. PATENT DOCUMENTS

| | | | |
|---|---|---|---|
| 2,826,265 | 3/1958 | De Woody | 55/528 |
| 2,910,763 | 11/1959 | Lauferbach | 55/528 |
| 2,933,154 | 4/1960 | Lauferbach | 55/97 |
| 3,417,552 | 12/1968 | Dyer et al. | 55/528 |
| 3,664,915 | 5/1962 | Gore | 161/164 |
| 3,935,046 | 1/1976 | Kiernan | 28/112 |
| 3,937,860 | 2/1976 | Gusman et al. | 428/228 |
| 3,986,851 | 10/1976 | Grodek | 55/488 |
| 4,025,679 | 5/1977 | Denny | 428/422 |
| 4,031,283 | 6/1977 | Fagen | 55/527 |
| 4,257,791 | 3/1981 | Wald | 55/528 |

FOREIGN PATENT DOCUMENTS 2621592 11/1977 Fed. Rep. of Germany ...... 428/234

*Primary Examiner*—Bernard Nozick
*Attorney, Agent, or Firm*—Hilmar L. Fricke

[57] ABSTRACT

A felt-like layered composite of the following structure:
  a. a first layer of a predominantly horizontal coplanar superimposed layers of filamentary polytetrafluoroethylene components interrupted by occasional interlayered orientation;
  b. a thin high density nonwoven layer of fine glass staple fibers;
  c. a scrim fabric of polytetrafluoroethylene fibers and
  d. a second predominantly horizontal coplanar superimposed layers of filamentary polytetrafluoroethylene components interrupted by occasional interlayer orientation;

wherein the layers are mechanically bonded together by filamentary polytetrafluoroethylene components extending vertically throughout the composite and a process for making this composite; the composite is useful as a filter fabric and is primarily used for bag filters to remove fly ash from the gaseous combustion products of coal fired furnaces and boilers.

10 Claims, 1 Drawing Figure

PTFE LAYER 1
GLASS PAPER 2
PTFE SCRIM CLOTH 3
PTFE LAYER 1

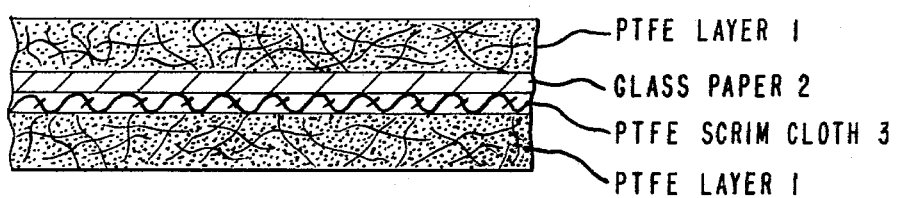

4,324,574

FELT-LIKE LAYERED COMPOSITE OF PTFE AND GLASS PAPER

BACKGROUND OF THE INVENTION

1. Field Of The Invention

This invention relates to nonwoven felt-like products of filamentary polytetrafluoroethylene (hereinafter referred to as PTFE).

2. Description Of The Prior Art

The formation of felts from polymeric filamentary materials is taught in Lauterbach U.S. Pat. No. 2,910,763 issued Nov. 3, 1959. The use of such felts for filtering is taught in Lauterbach U.S. Pat. No. 2,933,154 issued Apr. 19, 1960. Felt-like products of PTFE have become commercial products and are used in filtration.

The use of PTFE felts as high efficiency and high porosity filters particularly useful as filters for the removal of fine particles such as fly ash from gaseous combustion products of coal fired furnaces and boilers is shown in Fagan U.S. Pat. No. 4,031,283 issued June 21, 1977.

To meet new stringent regulations, filters which are more efficient, have a low level of leakage of particles, are cleanable and are resistant to blinding are required. However, porosity of the filters must still be high to maintain the air pressure drop across the filter at a very low level. Also, the air/filter cloth, i.e., the ratio of volume of air which passes through an area of the filter, must be at a high level.

SUMMARY OF THE INVENTION

A felt-like layered composite has the following structure:

a. a first layer of a predominantly horizontal coplanar superimposed layers of filamentary polytetrafluoroethylene components interrupted by occasional interlayered orientation;
b. a thin high density nonwoven layer of fine glass staple fibers;
c. a scrim fabric of polytetrafluoroethylene fibers and
d. a second predominantly horizontal coplanar superimposed layers of filamentary polytetrafluoroethylene components interrupted by occasional interlayer orientation;

wherein the layers are mechanically bonded together by filamentary polytetrafluoroethylene components extending vertically throughout the composite and a process for making such a composite also is a part of this invention.

BRIEF DESCRIPTION OF THE DRAWING

The FIGURE illustrates a cross section of the layered composite structure of this invention.

DESCRIPTION OF THE INVENTION

The FIGURE shows a cross section of the layered composite structure of this invention. A filamentary PTFE layer 1 is in superimposed adherence to a thin high density nonwoven layer of fine glass staple fibers (hereinafter referred to as glass paper) 2 which in turn is in firm adherence to a PTFE scrim cloth 3 to which is firmly adhered a second layer of filamentary PTFE. The entire composite has been needled to firmly mechanically adhere the layers together by filamentary PTFE components that vertically extend through the composite.

The production of felt-like products is taught in the aforementioned Lauterbach U.S. Pat. No. 2,910,763 which is hereby incorporated by reference. Lauterbach discloses that PTFE filamentary materials can be used for making felts.

One process for producing the felt-like composite uses the following steps:

(1) a loose batt of filamentary PTFE in superimposed layers is formed on a glass paper which is placed over a PTFE scrim fabric;
(2) the structure formed in step (1) is mechanically needled to bond the paper, the batt and the scrim fabric into a felt like structure, wherein filamentary PTFE components extend vertically throughout the structure;
(3) a second filamentary batt of superimposed layers is formed on the scrim fabric side of the structure of step (2);
(4) mechanically needling the batt to bond the batt to the structure of step (2) and thereby forming a felt-like composite structure, wherein filamentary PTFE components extend vertically throughout the structure;
(5) heat setting the felt like composite structure formed in step (4) by exposing the composite structure to a temperature 230° to 315° C. usually for about 4 to 10 minutes.

The filamentary PTFE used herein can be any commercially available PTFE filament in the full range of denier. To obtain a product which is the most commercially acceptable, a denier range of 2–10 is preferred, a range of 5–9 is more preferred, and a range of 6–7 is even more preferred.

PTFE filaments are produced by various methods, including slitting PTFE film into thin structures and then expanding and orienting these structures as shown in Gore U.S. Pat. No. 3,664,915, issued May 23, 1972; or by blending viscous with a PTFE dispersion, and then extruding the filament and removing the viscous. This extruded filament is dark brown; however, it can be bleached, if desired by various techniques, for example, passing it through a nitric acid bath or baking it at high temperatures. The extruded PTFE filament is preferred for use in the invention.

The PTFE filaments are cut into a staple length of about 1 to 6 inches preferably about 4.5 inches before being formed into a batt in the above process.

The glass paper used herein has a very high level of air permeability, is of fine glass staple fiber of about 0.2–1.0 inches in length and is available from commercial sources. The paper is about 5–30 mils in thickness. The glass paper can contain up to 20% by weight of filamentary PTFE components. The paper blocks the passage of very fine particles through the composite structure without causing an excessive pressure drop and decrease in air porosity.

The PTFE scrim fabric used herein can be any of the commercially available fabrics and usually is about 5–15 mils in thickness. The fabric is usually constructed of about 200 to 1,000 denier PTFE yarn.

As the Lauterbach reference discloses, there are many nuances allowable in processes for forming felt; however, the last step of any process is compacting, i.e., retraction or condensation. Compacting may result from a simple reduction in length (i.e., shriveling) or from a distortion of the filament into an irregular shape (i.e., crimping or curing) or both.

The composite is preferably compacted by placing a roll of uncompacted composite structure onto a tenter frame and passing the composite structure through an oven. A tenter frame is a device commonly known by those skilled in the art. The tenter frame allows the edges of the structure to be attached to it by various means, for example, to provide support to the felt during compacting, and to pull the structure through the oven.

The oven will have a means for heating the composite structure. The means can be air having a temperature of 230°–315° C., preferably 245°–275° C., and most preferable, about 255°–265° C. Preferably, air jets will be used to blow the hot air against both the upper and lower surfaces of the composite structure.

The composite structure will advance through the oven upon the tenter frame at a rate above 20 yards per minute, preferably 25–40, and more preferably about 28–32 yards per minute.

The dwell time for each pass within the oven should be above 2 minutes, and preferably about 2.5 minutes.

The composite structure will have more than two changes of direction within the oven. The angle of the change of direction can vary from about 45° to about 240°, preferably, 135°–235°, more preferably 160°–200°. It is preferable to have at least 6 changes of direction. Rollers can be used to change the direction of the felt. Preferred rollers have a diameter greater than about 12 inches more preferably, between about 16–20 inches. The composite structure preferably will undergo more than one pass in the oven.

The resulting composite structure is about 40–140 mils thick. The composite filamentary PTFE layers are each about 15–30 mils thick, the scrim fabric is about 5–15 mils thick and the glass paper is about 5–30 mils thick.

Another particularly useful composite structure has a second glass paper positioned between the PTFE scrim fabric and the second layer of filamentary PTFE. In step (4) of the aforementioned process, this second glass paper is also needled into the composite structure.

The composite structure of the present invention, which can be prepared as suggested above, when compared with the currently commercially available felts, has as high a filtration efficiency while having a high porosity and a significant decrease in absolute leakage.

The porosity of the composite structure is determined by the Standard Method of Test for Air Permeability of Textile Fabrics, ASTM-D-737-69, also known as the Frazier Air Porosity Test.

Air porosity or air permeability is the rate of the air flow through a material under a differential pressure between the two fabric surfaces. Air porosity is expressed in U.S. customary units as cubic feet of air per minute per square foot (CFM) of fabric at a stated pressure differential between the two surfaces of the fabric.

A filter made from the composite structure of this invention has an efficiency greater than 98%, preferably 99, and even more preferably 99.75.

The composite structures have high efficiency while having an air porosity, measured at 0.5-inch water gauge (W.G.), of greater than 10 cubic feet per minute (CFM) and preferably greater than 25 CFM.

The following example illustrates the invention. All parts and percentages are on a weight basis unless otherwise indicated.

EXAMPLE

Extruded PTFE filaments having 6.67 denier are skeined and cut into 4.5-inch staple. The staple is garnetted to comb and orient the staple.

The combed staple is deposited and cross-lapped onto a thin high density nonwoven layer of fine glass staple fibers hereinafter referred to as a glass paper. The glass paper is placed onto a PTFE scrim fabric. A scrim fabric is used to provide additional support to the composite structure.

The glass paper is about 15 mils thick and is formed of about 0.3 denier fine (5 micron diameter) glass staple fibers about ¼ inches in length and contains about 4% by weight of a polyvinyl alcohol binder which is driven off during the subsequent heating step.

The scrim is a PTFE fabric weighing 0.9 pounds/yard length/77 inches wide. The one-side coated scrim is lightly needled to facilitate handling.

The resulting structure is then passed through a tacker loom with regular barbed needles to punch PTFE staples into and through the batt, paper and scrim fabric in a direction substantially perpendicular to the structure.

The one side coated structure is then turned over and a second glass paper is placed in contact with the scrim fabric and combed staple is deposited and crosslapped onto the second paper to form a batt.

The resulting structure is again passed through the tacker loom and then the structure is passed through a needle loom and needled about 1,500 times per square inch. The composite structure is compacted by heat shrinkage to provide further strength and higher density and to increase its heat stability.

The composite structure is compacted in a Kenyon Dryer sold by Kenyon Company. First, the composite is placed onto the tenter frame of the Kenyon Dryer. Then the composite structure while on the tenter frame, travels through the oven of the Kenyon Dryer. The distance traveled on the tenter frame within the oven is 76 yards. The composite structure travels at a speed of 30 yards per minute and has a dwell time within of the oven of 2½ minutes.

While in the oven, the composite structure changes direction seven times by going round seven rollers, each having an 18-inch diameter. The angle of the change of direction is 180°.

The oven has hot air nozzles which blow hot air (at 260° C.) directly onto the upper and lower surfaces of the felt. The nozzles are holes placed along the length of tubes and positioned to allow air passing through the holes to blow directly onto the felt. The roll of composite structure is passed through the oven twice.

The following is a summary of physical properties of composite structures:
  Weight—29 (Oz. per Square Yard)
  Frazier Air Porosity—13 CFM per square foot at 0.5" W.G.
  Efficiency—99.93%
  Absolute Leakage—0.002 grains/cubic feet per minute of air To determine % efficiency a gavimetric method is used. In this test, known amounts of test fly ash are fed continuously at a reasonably controlled rate using a mechanical feed device to feed fly ash to an air stream. Efficiency is determined by positioning a pre-weighed "absolute" filter (pore size=0.8 micron) downstream of the test specimen. The weight gained by the "absolute"

filter after the test is completed constitutes the amount of dust that has penetrated through the test specimen.

To determine absolute leakage, an air stream at 175° C. containing 2.5 grains of dust per cubic foot of air is continuously passed through a sample of the composite structure over an 8 hours period using and air volume to sample ratio of 7.5 cubic feet of air per 1 square foot of filter media. Absolute leakage is the quantitative amount of dust that passes through the sample and is expressed as grains per cubic foot per minute of air.

I claim:

1. A felt-like layered composite comprising the following:
   a. a first layer of predominantly horizontal coplanar superimposed layers of filamentary polytetrafluoroethylene components interrupted by occasional interlayered orientation;
   b. a thin high density nonwoven layer comprising fine glass staple fibers;
   c. a scrim fabric of polytetrafluoroethylene fibers and
   d. a second predominantly horizontal coplanar superimposed layers of filamentary polytetrafluoroethylene components interrupted by occasional interlayer orientation;
   wherein the layers are mechanically bonded together by filamentary polytetrafluoroethylene components extending vertically throughout the composite and the composite has a filter efficiency of greater than 98%.

2. The felt-like composite of claim 1 having a thickness of 40-140 mils.

3. The felt-like composite of claim 2 having an air porosity measured at 0.5 mils W.G. of greater than 10 cubic feet per minute.

4. The felt-like composite of claim 3 in which the filamentary polytetrafluoroethylene components have a denier of about 2-10.

5. The felt-like composite of claim 3 in which the glass-stable fibers have a denier of about 0.1-1.

6. The felt-like composite of claim 3 in which the filamentary polytetrafluoroethylene layers are each about 15-30 mils in thickness; the thin high density nonwoven layer of glass staple is about 5-30 mils thick and the scrim fabric is about 5-15 mils thick.

7. The felt-like composite of claim 3 in which a second layer of the thin high density nonwoven layer of fine staple glass fibers is between the scrim fabric and the second filamentary polytetrafluoroethylene layer.

8. The felt-like composite of claim 3 or claim 7 in which the thin high density nonwoven layer of staple glass fibers contains up to 20% by weight of filamentary polytetrafluoroethylene components.

9. A process for producing a felt-like layered composite comprising the following:
   a. a first layer of a predominantly horizontal coplanar superimposed layers of filamentary polytetrafluoroethylene components interrupted by occasional interlayered orientation;
   b. a thin high density nonwoven layer comprising fine glass staple fibers;
   c. a scrim fabric of polytetrafluoroethylene fibers and
   d. a second predominantly horizontal coplanar superimposed layers of filamentary polytetrafluoroethylene components interrupted by occasional interlayer orientation; wherein the layers are mechanically bonded together by filamentary polytetrafluoroethylene components extending vertically through the composite; which process comprises the following steps:
   (1) forming filamentary polytetrafluoroethylene in superimposed layers into a loose batt on the thin high density nonwoven layer of fine glass staple fibers and a polytetrafluoroethylene scrim fabric;
   (2) mechanically needling the batt to mechanically bond the batt to the paper and the scrim fabric and form a felt-like structure;
   (3) forming a second batt of filamentary polytetrafluoroethylene of superimposed layers of the scrim fabric side of the structure formed in step (2);
   (4) mechanically needling the batt to mechanically bond the batt to the structure formed in step (2) and thereby forming a felt-like composite structure;
   (5) heat setting the felt-like composite structure formed in step (4) by exposing the composite to 230°-315° C.

10. The process of claim 9 in which a second layer of the thin high density nonwoven layer of glass staple fibers is positioned between the scrim fabric and the second batt of filamentary polytetrafluoroethylene.

* * * * *